United States Patent
Cook et al.

[19]

[11] Patent Number: 5,552,195
[45] Date of Patent: Sep. 3, 1996

[54] TRIM STRIP AND METHOD FOR MAKING SAME

[75] Inventors: Bernard L. Cook, Dayton; David D. Dilley, Centerville, both of Ohio

[73] Assignee: Plastic Trim, Inc., Dayton, Ohio

[21] Appl. No.: 458,397

[22] Filed: Jun. 2, 1995

Related U.S. Application Data

[62] Division of Ser. No. 34,084, Mar. 22, 1993, Pat. No. 5,456,786.

[51] Int. Cl.$^6$ ............................................. B60R 13/04
[52] U.S. Cl. ............................ 428/31; 52/716.5; 293/128
[58] Field of Search ........................... 428/31; 293/128; 52/716.5

[56] References Cited

U.S. PATENT DOCUMENTS

| | | | |
|---|---|---|---|
| 3,046,174 | 7/1962 | Brooks et al. | 428/31 X |
| 3,232,818 | 2/1966 | Loew et al. | 428/31 X |
| 3,547,515 | 12/1970 | Shanok et al. | 428/31 X |
| 3,959,538 | 5/1976 | Leow | 428/31 |
| 3,970,498 | 7/1976 | Loew | 428/31 X |
| 4,039,215 | 8/1977 | Minhinnick | 293/142 |
| 4,066,285 | 1/1978 | Hall et al. | 428/31 X |
| 4,160,052 | 7/1979 | Krysiak et al. | 428/31 |
| 4,174,986 | 11/1979 | Jennings | 428/31 X |
| 4,250,596 | 2/1981 | Hara et al. | 428/31 X |
| 4,275,009 | 6/1981 | Dani | 428/31 |
| 4,291,076 | 9/1981 | Katoh | 428/31 |
| 4,332,074 | 6/1982 | Auld et al. | 428/31 X |
| 4,446,179 | 5/1984 | Waugh | 428/31 |
| 4,489,019 | 12/1984 | Takeda et al. | 428/31 X |
| 4,566,929 | 1/1986 | Waugh | 428/31 X |
| 4,617,209 | 10/1986 | Ives | 428/31 |
| 4,619,847 | 10/1986 | Jackson | 428/31 |
| 4,719,067 | 1/1988 | Thiel | 428/31 X |
| 4,767,647 | 8/1988 | Bree | 428/31 X |
| 4,778,550 | 10/1988 | Barton et al. | 428/31 X |
| 4,808,450 | 2/1989 | Guy | 428/31 |
| 4,838,004 | 6/1989 | Adell | 52/716.6 |
| 4,868,021 | 9/1989 | Zoller | 428/31 |
| 4,878,273 | 11/1989 | West et al. | 52/716.6 X |
| 4,880,674 | 11/1989 | Shimizu | 428/31 |
| 4,911,959 | 3/1990 | Miyakawa | 428/31 |
| 4,940,557 | 7/1990 | Kimura | 428/31 X |
| 4,978,490 | 12/1990 | Jackson | 264/148 |
| 5,023,033 | 6/1991 | Cakmakei | 264/161 |
| 5,085,902 | 2/1992 | Yada et al. | 428/31 |
| 5,108,681 | 4/1992 | Cakmakei | 428/31 X |
| 5,139,830 | 8/1992 | Gross | 428/31 |
| 5,171,499 | 12/1992 | Cehelnik et al. | 428/31 X |
| 5,226,998 | 7/1993 | Few | 428/31 X |
| 5,227,108 | 7/1993 | Reid, Jr. et al. | 428/31 X |

*Primary Examiner*—Henry F. Epstein
*Attorney, Agent, or Firm*—Killworth, Gottman, Hagan & Schaeff

[57] ABSTRACT

A flexible trim strip is provided comprising an elongate strip having an outer peripheral edge. The elongate strip is formed of one or more layers of thermoplastic material and has a molded edge portion on a substantial portion of its outer peripheral edge. Provided on the underside of the elongate strip are one or more retaining members and one or more locator pins. A method is also provided for forming a trim strip having a molded edge portion on a substantial portion of its outer peripheral edge.

15 Claims, 5 Drawing Sheets

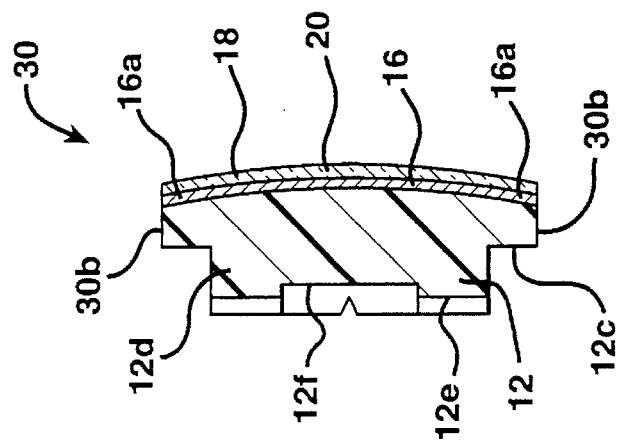
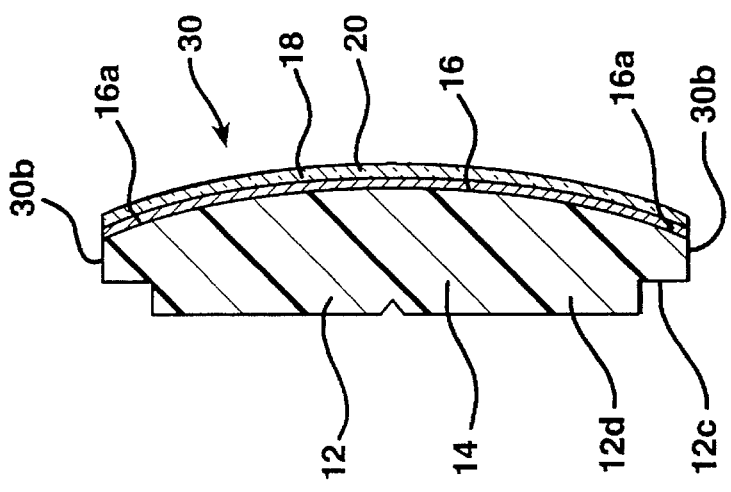
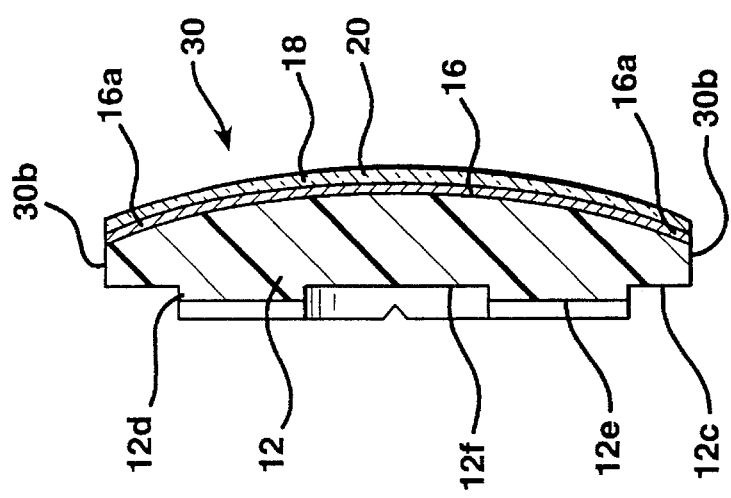

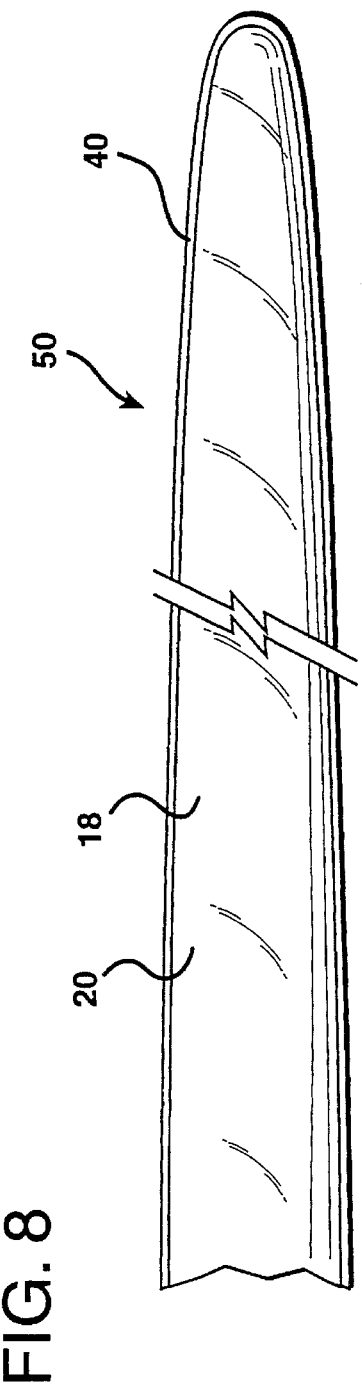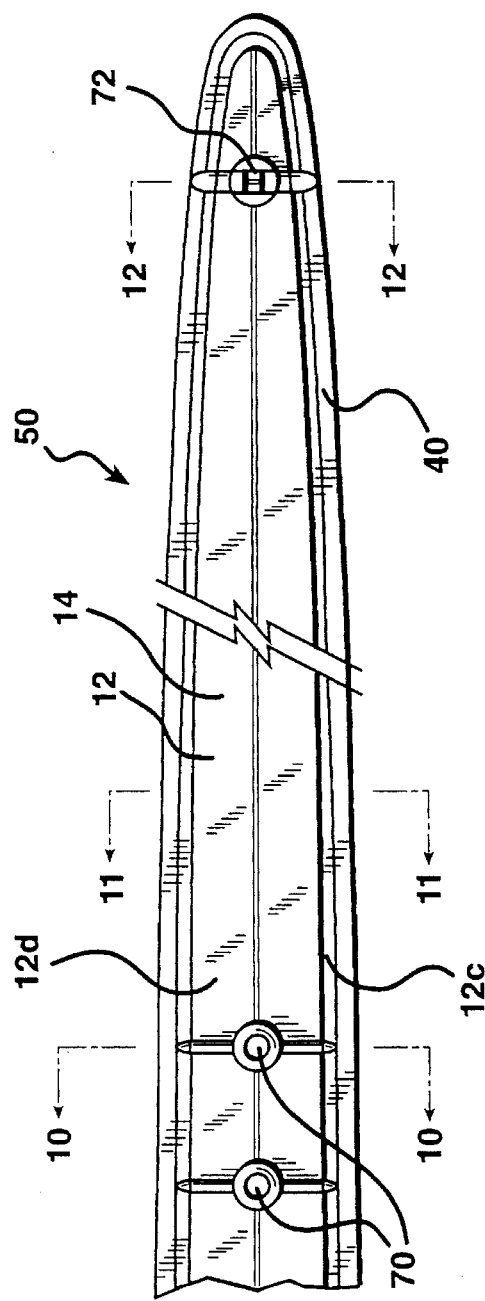
FIG. 8
FIG. 9

TRIM STRIP AND METHOD FOR MAKING SAME

This is a divisional of U.S. patent application Ser. No. 08/034,084 filed Mar. 22, 1993 and now U.S. Pat. No. 5,456,786.

BACKGROUND OF THE INVENTION

The present invention relates to improvements in trim strips and, more particularly, to a method for making an improved trim strip having a molded outer peripheral edge portion, and to the improved trim strip produced thereby.

Trim strips are frequently used as protective and/or decorative accessories for motor vehicles, boats, aircraft, appliances, machines and other apparatus. For example, trim strips can be employed as body side molding on motor vehicles to provide impact protection from door strikes and also to enhance the aesthetic appeal of the vehicle.

One prior art trim strip comprises an .extruded base, a decorative laminate mounted to the upper surface of the base, and a clear protective layer applied over the decorative laminate. The protective layer is joined to the extruded base. Together they encase the decorative laminate and seal it from the outside environment which can degrade the appearance of the decorative laminate.

The prior art trim strip is substantially rectangular in shape and has generally the same thickness along its entire length. If a non-rectangular shape is desired and the trim strip is cut to that desired shape, the seal about the decorative laminate will be broken. This will result in the laminate being exposed to the outside environment which could cause degradation of the appearance of the laminate.

Accordingly, there is a need for an improved method for forming a trim strip which allows the shape of the trim strip to be varied without the decorative laminate being exposed to the outside environment.

SUMMARY OF THE INVENTION

This need is met by the present invention wherein an improved trim strip is provided having a molded edge portion provided along substantially its entire outer peripheral edge. The improved trim strip further includes molded locator pins and retaining members. Additionally, the thickness of at least a portion of the trim strip can be reduced to permit the strip to conform to a receiving surface or recess.

In accordance with one aspect of the present invention, a method is provided for forming a flexible trim strip. The method comprises the steps of providing an elongate strip having an outer peripheral edge and molding an edge portion onto substantially the entire outer peripheral edge of the elongate strip. The edge portion is preferably injection molded onto the outer peripheral edge of the elongate strip.

The step of providing an elongate strip comprises the steps of: extruding a strip of first thermoplastic material; securing a substantially continuous decorative laminate, such as a metallized film, onto the upper surface of the strip of first thermoplastic material; extruding a layer of second thermoplastic material onto the upper surface of the decorative laminate so as to form a three-layer strip; reducing the thickness of at least a portion of the three-layer strip; and trimming the three-layer strip to a desired shape so as to form the elongate strip.

The method may further comprise the step of injection molding one or more retaining members and one or more locator pins onto the underside of the elongate strip.

In accordance with a second aspect of the present invention, a method is provided for forming a trim strip having an injection molded edge portion. The method comprises the steps of: providing an elongate strip having an outer peripheral edge; placing the elongate strip into an injection molding die having an internal cavity; injecting thermoplastic material into the cavity of the die such that the material contacts and bonds to substantially the entire outer peripheral edge of the elongate strip; and withdrawing the elongate strip from the injection molding die.

In accordance with a third aspect of the present invention, a method is provided for forming a finished trim strip comprising the steps of providing an elongate strip, and molding at least one of a retaining member and a locator pin onto a portion of the underside of the elongate strip. The method may additionally comprise the step of molding an edge portion onto substantially the entire outer peripheral edge of the elongate strip.

In accordance with a fourth aspect of the present invention, a trim strip is provided comprising an elongate strip having an outer peripheral edge. The elongate strip is formed of one or more layers of thermoplastic material and has a molded edge portion on a substantial portion of its outer peripheral edge. The trim strip may also include one or more retaining members and one or more locator pins on the underside of the elongate strip.

Accordingly, it is an object of the present invention to provide an improved trim strip having a molded edge portion provided along substantially its entire outer peripheral edge. It is a further object of the present invention to provide an improved trim strip having one or more locator pins located on the underside of the trim strip. It is another object of the present invention to provide an improved trim strip having one more retaining members located on the underside of the trim strip. It is yet a further object of the present invention to provide a trim strip having a varied thickness. It is yet another object of the present invention to provide a method for forming a trim strip having a molded edge portion. It is a further object of the present invention to provide a method for forming a trim strip having at least one of a locator pin and a retaining member on the underside of the trim strip. These and other objects and advantages of the present invention will be apparent from the following description, the accompanying drawings, and the appended claims.

BRIEF DESCRIPTION OF THE DRAWINGS

FIG. 5 is a cross-sectional view taken generally along section line 5—5 in FIG. 4;

FIG. 6 is a cross-sectional view taken generally along section line 6—6 in FIG. 4;

FIG. 7 is a cross-sectional view taken generally along section line 7—7 in FIG. 4;

FIG. 8 is a top plan view, broken-away, of a trim strip formed in accordance with the present invention;

FIG. 9 is a bottom plan view, broken-away, of the trim strip shown in FIG. 8;

DETAILED DESCRIPTION OF THE INVENTION

Figure 1:
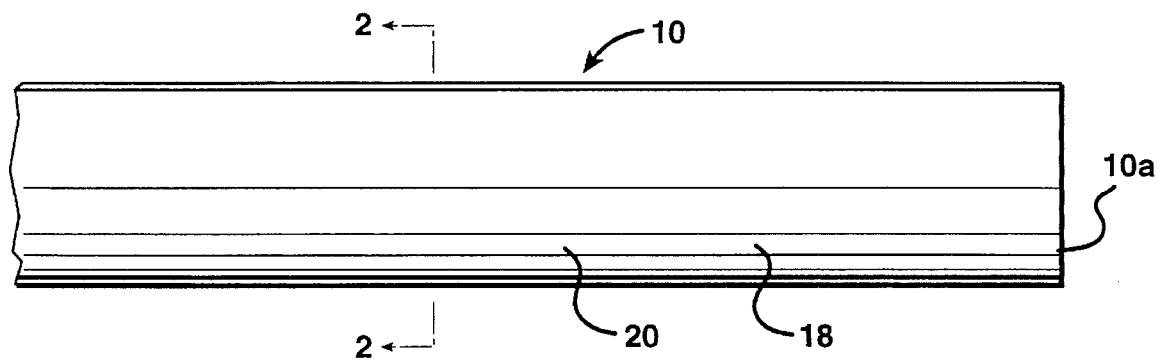
FIG. 1 is a top plan view, broken-away, of a three-layer strip from which a trim strip of the present invention is formed.
Figure 2:
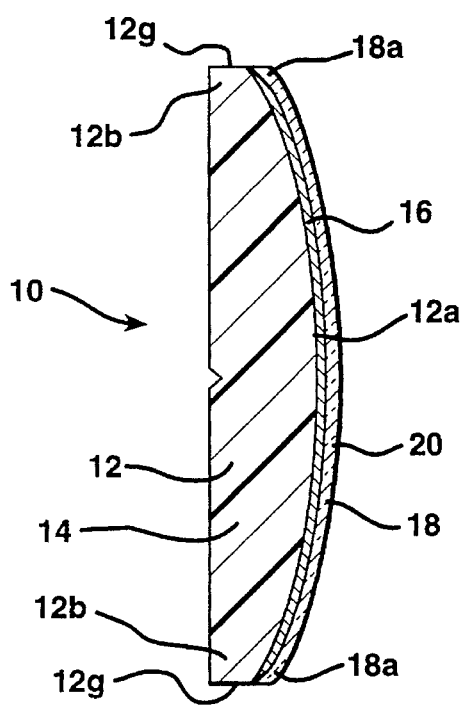
FIG. 2 is a cross-sectional view taken generally along section line 2—2 in FIG. 1.

Referring now to FIGS. 1 and 2, a three-layer strip 10 is shown having a base layer 12 of first thermoplastic material 14 extruded from a conventional extrusion device (not shown). The first thermoplastic material 14 is preferably polyvinyl chloride, but may be acrylonitrile butadiene styrene, polystyrene, thermoplastic polyurethane, synthetic or natural rubber, nylon, polycarbonate, acrylic, copolymers of ethylene and vinyl acetate, and polyolefins such as polyethylene and polypropylene.

Applied to the upper surface 12a of the base layer 12 is a decorative laminate 16 which, preferably, is an aluminized polyester film having a thin layer of polyvinyl chloride on its underside. The decorative laminate 16 is applied to the thermoplastic material 14 just after the thermoplastic material 14 is extruded from the extrusion device. This allows the thin layer of polyvinyl chloride on the underside of the decorative laminate 16 to bond with the heated thermoplastic material 14.

The three-layer strip 10 further includes a substantially transparent outer layer 18 applied over the decorative laminate 16. The outer layer 18 is formed from a second thermoplastic material 20 which, preferably, is clear polyvinyl chloride. The second thermoplastic material 20 may alternatively comprise any of the materials listed above which may be used to form the base layer 12.

The second thermoplastic material 20 is extruded from a second conventional extrusion device (not shown). Outer edge portion 18a of the polyvinyl chloride outer layer 18 bonds with outer edge portion 12b of the polyvinyl chloride base layer 12 to encase the decorative laminate 16.

After the outer layer 18 is applied to the decorate laminate 16, the three layers of material are passed through conventional laminating rollers (not shown), cooled and cut to desired lengths to form three-layer strips 10. The three-layer strip 10 in FIG. 1 is shown having a cut end portion 10a. It additionally includes a second cut end portion, which is not shown.

Figure 4:
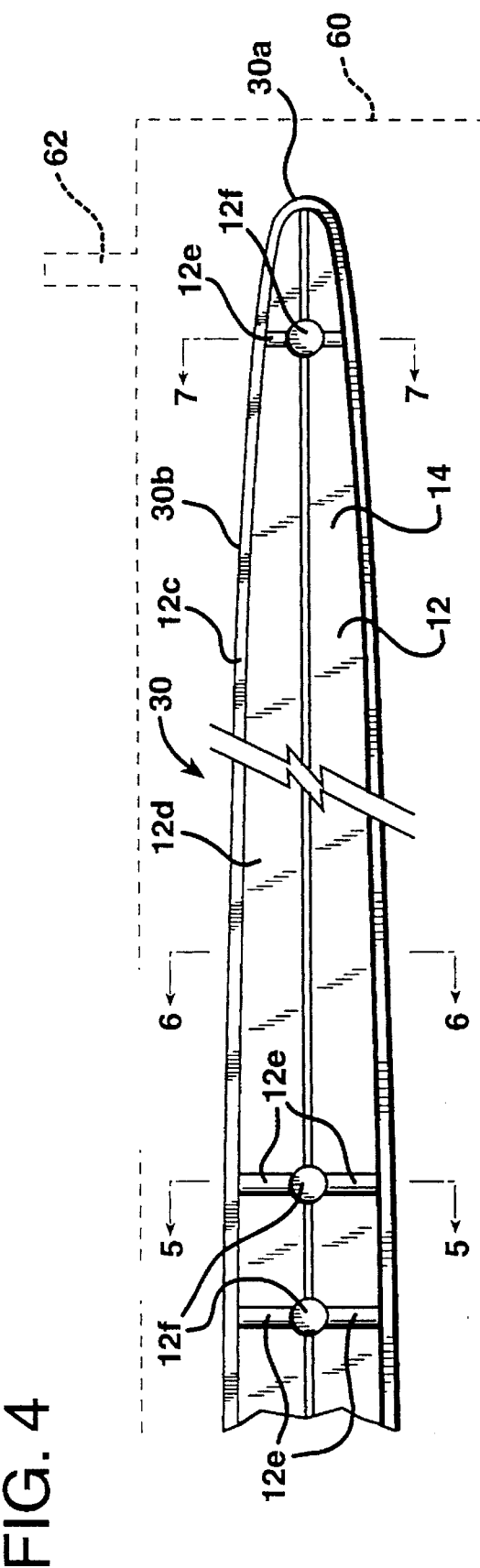
FIG. 4 is a bottom plan view, broken-away, of the elongate strip shown in FIG. 3.
Figure 10:
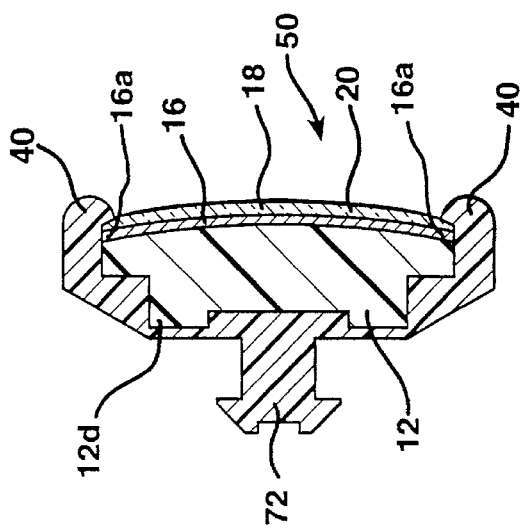
FIG. 10 is a cross-sectional view taken generally along section line 10—10 in FIG. 9.
Figure 11:
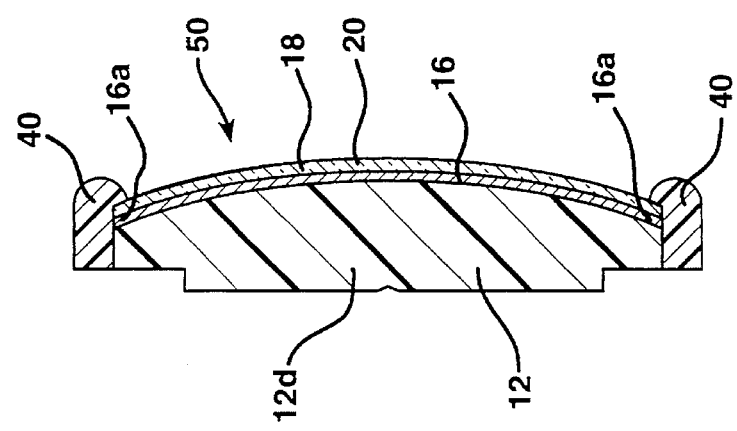
FIG. 11 is a cross-sectional view taken generally along section line 11—11 in FIG. 9.
Figure 12:
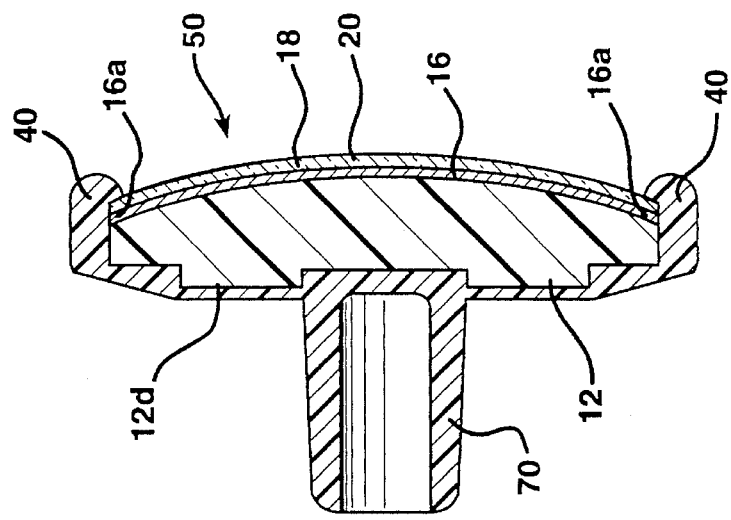
FIG. 12 is a cross-sectional view taken generally along section line 12—12 in FIG. 9.

In accordance with the method of the present invention, the three-layer strip 10 is milled by a conventional milling machine (not shown) to cut away a portion of the material along the outer edge 12g of the base layer 12 to define an outer step 12c, see FIG. 4. The outer step 12c is provided to allow the finished strip to conform to the surface to which it is to be secured. The three-layer strip 10 may be milled or cut to obtain other shapes and configurations not explicitly set out herein. Further, the entire outer surface of the base layer 12 may be milled to reduce the thickness of the entire three-layer strip 10.

Further in accordance with the method of the present invention, the center portion 12d of the base layer 12 is milled or cut to define channels 12e and recesses 12f. The channels 12e comprise pathways for thermoplastic material to flow into the recesses 12f during a subsequent injection molding step. As will be discussed more explicitly below, the thermoplastic material received in the recesses 12f is formed into locator pins and retaining members which extend from the underside of the finished trim strip.

Figure 3:
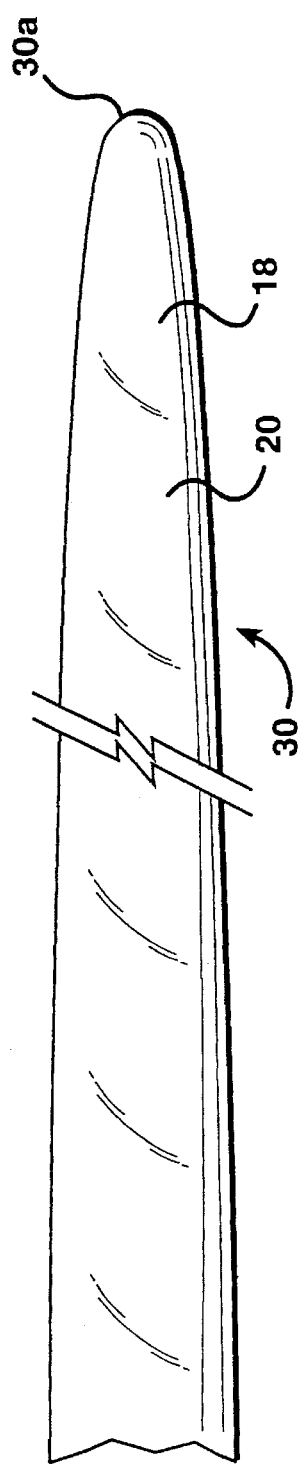
FIG. 3 is a top plan view, broken-away, of an elongate strip which forms a portion of the trim strip of the present invention.

Following milling, the three-layer strip 10 is cut or trimmed to a desired shape to form an elongate strip 30, see FIGS. 3 and 4. In the illustrated embodiment, the elongate strip 30 has been cut so as to have elliptical-shaped ends 30a (only one of which is shown). The three-layer strip 10 can be cut in a conventional stamping press. Alternatively, it may be laser cut or water jet trimmed to form the elongate strip 30. It will be apparent to one skilled in the art that the three-layer strip 10 may be cut or trimmed to obtain other shapes and configurations not explicitly set out herein.

After the three-layer strip 10 has been cut to form the elongate strip 30, the edge portion 16a of the decorative laminate 16 is exposed, see FIGS. 5–7. In order to seal the edge portion 16a of the decorate laminate 16 to protect same from the outside environment, an edge portion 40 is formed about the outer peripheral edge 30b of the elongate strip 30, see FIGS. 8–12. In addition to protecting the decorative laminate from the harmful effects of the outside environment, the edge portion 40 also serves to enhance the aesthetic appeal of the finished trim strip 50.

The edge portion 40 is molded onto the outer peripheral edge 30b of the elongate strip 30 in a conventional injection molding die 60, shown in broken line in FIG. 4, which includes an internal cavity and an injection inlet 62. During the molding step, the elongate strip 30 is placed within the internal cavity of the injection molding die 60 and thermoplastic material, preferably polyvinyl chloride, is injected into the internal cavity under pressure through inlet 62. The thermoplastic material bonds to the outer peripheral edge 30b of the elongate strip 30 to form the edge portion 40. The thermoplastic material also travels to the recesses 12f in the elongate strip 30 via channels 12e to form locator pins 70 and retaining members 72 (only one retaining member 72 is shown). The locator pins 70 are provided to ensure that the finished trim strip 50 is properly located on a surface, such as a bumper fascia (not shown), during assembly. The retaining members 72, together with conventional double-faced adhesive tape (not shown), secure the trim strip 50 to the bumper fascia. After the injected thermoplastic material has substantially cooled, the finished trim strip 50 is removed from the internal cavity of the injection molding die 60.

It is further contemplated by the present invention that an edge portion may be molded onto an elongate strip without also molding locator pins or retaining members on the elongate strip. It is additionally contemplated by the present invention that locator pins and/or retaining members may be molded on an elongate strip without also molding an edge portion onto the elongate strip.

Having described the invention in detail and by reference to preferred embodiments thereof, it will be apparent that modifications and variations are possible without departing from the scope of the invention defined in the appended claims.

What is claimed is:

1. A trim strip comprising:

an elongate strip having an outer peripheral edge and an upper surface, said elongate strip being formed of two or more layers of material and having a molded edge portion on a substantial portion of its outer peripheral edge which engages said upper surface.

2. A trim strip as set forth in claim 1, further comprising an injection molded retaining member on a portion of the underside of said elongate strip.

3. A trim strip as set forth in claim 1, further comprising an injection molded locator pin on a portion of the underside of said elongate strip.

4. A trim strip as set forth in claim 1, wherein said elongate strip comprises:

an extruded strip of first thermoplastic material;

a substantially continuous decorative laminate secured onto the upper surface of said strip of first thermoplastic material; and an extruded layer of second thermoplastic material positioned on the upper surface of said decorative laminate.

5. A trim strip as set forth in claim 4, wherein said decorative laminate comprises a metallized film.

6. A trim strip as set forth in claim 4, wherein said strip of first thermoplastic material has an outer peripheral edge shaped so as to define an outer step along substantially its entire extent.

7. A trim strip as set forth in claim 6, wherein said decorative laminate is shaped so as to extend to generally the outer edge of said strip of first thermoplastic material.

8. A trim strip as set forth in claim 4, wherein said strip of first thermoplastic material has a first portion having a first thickness and a second portion having a second thickness which is less than said first thickness.

9. A trim strip as set forth in claim 1, wherein said elongate strip has a generally non-rectangular shape.

10. A trim strip comprising:

an elongate strip having an outer peripheral edge, said elongate strip including a first strip of thermoplastic material, a substantially continuous decorative laminate secured onto the upper surface of said first strip of thermoplastic material, and a second strip of thermoplastic material positioned on the upper surface of said decorative laminate, said elongate strip having a molded edge portion on a portion of its outer peripheral edge.

11. A trim strip as set forth in claim 10, wherein said first strip of thermoplastic material has an outer peripheral edge shaped so as to define an outer step along substantially its entire extent.

12. A trim strip as set forth in claim 10, wherein said decorative laminate is shaped so as to extend to generally the outer edge of said first strip of thermoplastic material.

13. A trim strip as set forth in claim 10, wherein said first strip of thermoplastic material has a first portion having a first thickness and a second portion having a second thickness which is less than said first thickness.

14. A trim strip as set forth in claim 10, wherein said elongate strip has a generally non-rectangular shape.

15. A trim strip as set forth in claim 10, wherein said decorative laminate comprises a metallized film.

* * * * *